UNITED STATES PATENT OFFICE 2,302,204

PROCESS FOR THE MANUFACTURE AND PURIFICATION OF URIC ACID

Howard S. Gable, Mount Washington, and Joseph Michael Bloodsworth, Kansas City, Mo.; said Bloodsworth assignor to said Gable No Drawing. Application April 3, 1940, Serial No. 327,638

8 Claims. (Cl. 260—255)

This invention relates to a process for the manufacture and purification of uric acid, and more particularly to a process for producing and purifying uric acid commercially; the principal objects of the present invention being to provide a good grade of purified uric acid in a convenient, economical and efficient manner.

Uric acid occurs in nature chiefly in the urinary excrement of animals. For example, it is the dominant ingredient in the excrement of reptiles (boa constrictor excrement sometimes containing as high as 90% uric acid), a major ingredient in marine bird guano, which contains from a few per cent up to as high as thirty per cent (30%) uric acid, and is a minor ingredient in the urinary excrement of various other animals. The percentage of uric acid present in any of these materials depends upon the diet of the animal and the individual history of the sample, since the conditions of drying, age and other factors affect the uric acid content of the sample.

The chief source for uric acid having commercial significance is marine bird guano, since this material is obtainable in quantity and at a reasonable cost. Reptile excrement is an ideal source, but it is not ordinarily available in sufficient quantities for commercial utilization. The urinary excrement of other animals may be available on a large scale, but in most instances the percentage of uric acid present is too small to make them practical commercial sources.

In the discussion which follows, we consider marine bird guano as a source for uric acid, but it should be understood that in giving examples we in no way limit the confines of this invention to this source alone. Uric acid may be extracted from any source of "crude" material containing uric acid and purified by this process.

One of the chief difficulties in the purification of uric acid has been the removal of certain highly colored pigments. These pigments follow the uric acid through many attempted separations and seem to be adsorbed by the uric acid and to have similar chemical properties. Since uric acid itself has strong adsorbing qualities, some of these pigments may not be removed by decolorizing carbon or other commonly utilized decolorizers. In fact, it has been found that uric acid may in some instances actually take up color from some grades of so-called decolorizing charcoal. One of the advantages of uric acid produced by this process is, therefore, that it is characterized by decolorizing properties.

It has been discovered that there are probably several groups of pigments present in crude uric acid. Some of these groups are easily removed from a uric acid solution with a small amount of a good grade of decolorizing charcoal, which material plays the further role of a clarifier of the solution from colloidal matter and a remover of certain objectionable odoriferous bodies. Other pigments may not be removed with animal charcoal, fuller's-earth, Permutit or other decolorizers, and when decolorization is attempted by use of a large excess of adsorbent so much of the uric acid is itself taken up by the adsorbent that the yield of purified material is too small for the process to have any commercial value.

We have found that these highly colored pigments and other impurities may be conveniently separated from uric acid by the crystallization of solutions of uric acid salts and derivatives. Preferably this may be accomplished through the aqueous or dilute alkaline solutions of alkali metal salts of uric acid, such as sodium, potassium, lithium or ammonium salts of uric acid, though this invention is in no way limited to aqueous or alkaline solutions of such salts. Sodium salts are cheap and easy to prepare and handle and therefore we give some preference to their use in uric acid purification.

Usually during the purification, one treatment with a good grade of decolorizing carbon is resorted to because it is a convenient way of removing some minor color pigments, certain colloidal impurities and odoriferous constituents.

We have further found that the equipment in which the uric acid solutions and solutions of uric acid derivatives and uric acid salts are handled has a bearing on the application of this process and on the yields and purity of the final products. For example, our experiments show that the composition of the vessels in which uric acid is treated and produced may advantageously be glass, glass lined, silica, or porcelain, and similar equipment is to be preferred over metallic equipment, especially iron. Iron sometimes has an unfavorable effect, when employed as containing vessels for conducting uric acid extractions and purifications in that there is a tendency of reaction, especially at temperatures above room temperature up to the boiling point of the solutions, between the iron vessel and the materials contained therein which tends to produce a complication in the removal of impurities and pigment materials. The introduction of a complexity of reactions can thus be circumvented by the employment of glass, glass lined, silica or porcelain equipment. We are in no wise, however, limiting the reaches of this invention to the use of glass, glass lined, silica or porcelain equipment, but are simply emphasizing that the most favorable conditions for the preparation of a pure product with a good yield and a minimum of difficulty in the manipulation are to be obtained by their use.

It should also be noted that the element of time has an important bearing on the various stages of this process. For example, the formation of pigment decomposition and condensation products, as well as decomposition of uric acid or uric acid salts and uric acid derivatives normally caused by exposure of uric acid to alkalis are to some extent a function of the time during which solutions of uric acid, uric acid salts and derivatives remain in contact with said equipment and alkalis, especially at temperatures above room temperature up to the boiling point of the solutions. The decomposition of uric acid, uric acid salts and derivatives, when treated in metallic equipment is normally more pronounced than in non-metallic equipment, but such decomposition may be controlled and substantially obviated by reasonably careful manipulation, as those skilled in the art will understand.

By the proper application of this process it is possible to obtain a snow-white uric acid ninety-seven to one hundred per cent (97–100%) pure, and practically ashless. A sodium hydroxide solution of uric acid produced by this process as viewed through a colorimeter shows only a trace of darkening, as compared with a pure solution of sodium hydroxide, and the material, when heated with concentrated sulphuric acid, shows little or no discoloration, which is indicative of the absence of certain organic impurities.

As an illustration of the manner in which this invention may be carried out, the following procedure for the extraction and purification of uric acid present in marine bird guano is given, though it is to be understood that this example in no manner limits the scope of the invention to this exact procedure, the series of steps and/or the illustrative sequence thereof, nor is the source of uric acid limited to marine bird guano.

EXAMPLE 1

The raw material, which should be a good grade of suitable guano, preferably of marine bird type, is dried and sifted to make it a free-flowing material and to free it from rocks, feathers and other debris.

The guano to the ratio of preferably approximately one pound to a gallon of approximately eight per cent (8%) sodium hydroxide solution is extracted in a suitable vessel with agitation for a variable time period usually depending upon the temperature of the solvent. It has been found that a satisfactory extraction period is from six to eight hours where the solvent is at a temperature of approximately eighty to one hundred degrees centigrade (80–100° C.). The water level in the vessel in which the extraction is performed is kept constant.

The material so extracted is then preferably filtered and the residue is washed preferably on the basis of two hundred milliliters, or cubic centimeters, of hot water per pound of guano originally used, the washings being added to the filtrate, and the residue, which consists chiefly of sand and other impurities, is discarded. The solution of filtrate and washings, which is black in color due to dissolved pigments, is then preferably precipitated with an excess of an acid, for example a mineral acid, such as sulphuric or hydrochloric acid. The uric acid precipitate is separated from the supernatant liquid and the remaining solution is discarded. The uric acid so formed is then washed well with water and allowed to dry. This material is designated as "crude uric acid."

The crude uric acid is then preferably dissolved in an approximately five to six per cent (5–6%) sodium hydroxide solution to the ratio of approximately one-half (½) pound crude uric acid per gallon of solution, this dissolution being effected by heat and agitation. The solution so formed may then be filtered to remove traces of insoluble matter. This solution of uric acid in sodium hydroxide produces a solution of sodium urate. The sodium urate solution is preferably evaporated to approximately twenty per cent (20%) of its original volume, cooled and the crystals of sodium urate may then be removed by filtration, the crystals then preferably being washed with a little ice water. On a large scale, it is practical to further concentrate the mother liquor and obtain a second crop of crystals. The mother liquor resulting from extraction of the second crop of crystals is then preferably precipitated with sulphuric acid and the uric acid so obtained may be returned to the stock of crude uric acid to be reworked in subsequent runs.

The crops of sodium urate crystals are then preferably dissolved in approximately a three per cent (3%) sodium hydroxide solution to the ratio of about 0.75 pound of crystals per gallon of sodium hydroxide solution. This solution is then evaporated preferably to about fifteen per cent (15%) of the original volume, cooled and the crystallized sodium urate filtered off. The mother liquor is then precipitated with sulphuric acid and the resulting uric acid returned to the crude uric acid stock as before. The crystals of sodium urate are washed with a little ice water and redissolved in a three per cent (3%) sodium hydroxide solution.

This last solution is then preferably treated with a good grade of decolorizing carbon to the ratio of preferably approximately one pound of decolorizing carbon per pound of uric acid in solution. When treated hot and not allowed to remain in contact with the decolorizing carbon for too long a period, it has been found that there is practically no loss of uric acid by adsorption to the charcoal. The solution is then filtered until clear and precipitated with an excess of sulphuric acid, the precipitates being suitably separated and the material so obtained resulting in a good grade of uric acid.

This uric acid, if desired, may be further purified by dissolving it in approximately a three per cent (3%) sodium hydroxide solution, recrystallization, washing with water and drying the resulting material in a manner similar to that above outlined.

In order to further clarify the example, supra, it is believed the following flow sheet will be an aid in explanation of the process embodying the present invention:

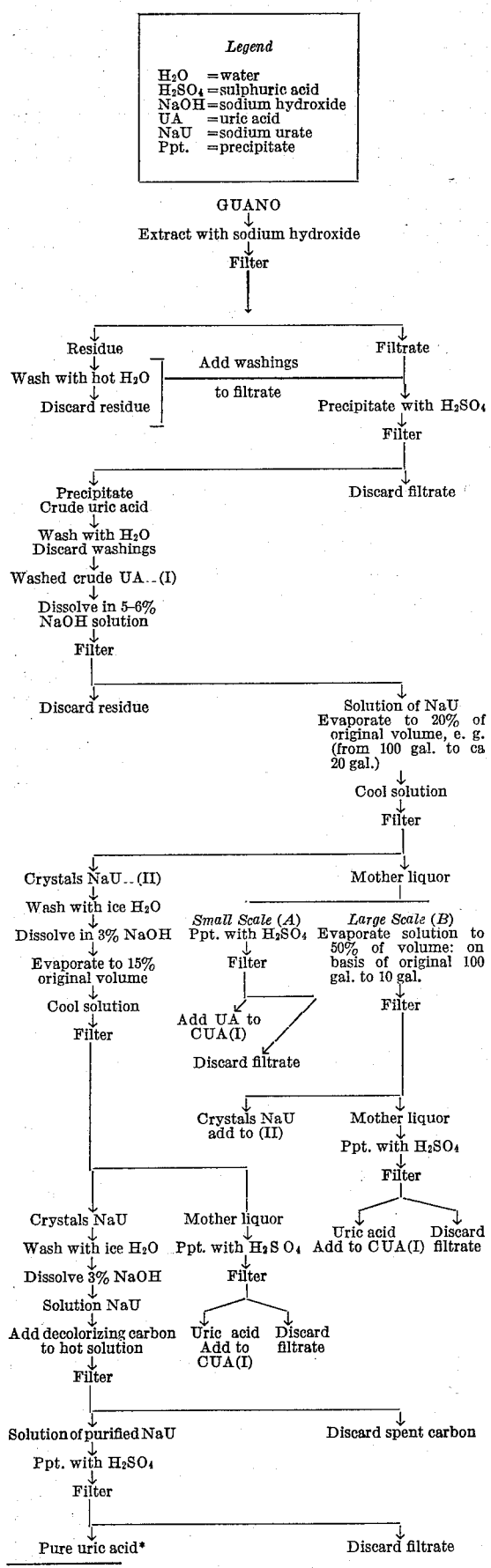

*The uric acid may be further purified by repetition of the crystallization and/or decolorization, as above.

This chemical, as so produced, is a snow-white product, and on the basis of twenty-five (25) pounds of crude uric acid, some ten or more pounds of purified uric acid are obtained.

EXAMPLE 2

It is also possible to purify the crystals of sodium urate as obtained at point II on the flow sheet of Example 1 by dissolving the sodium urate in a suitable solvent at a temperature in excess of room temperature up to the boiling point of the solvent as a limiting factor to form a concentrated solution of sodium urate in the solvent, separating the concentrated solution of sodium urate from any undissolved material, cooling the solution from the elevated temperature down to a lower temperature, using the freezing point of the solution as a limit, to separate the crystals of sodium urate which crop out of the solution by virtue of the lesser solubility of the sodium urate in the cold solvent.

The sodium urate crystals may be further treated and purified uric acid separated therefrom substantially in the manner outlined in Example 1, or they may be further purified by a repetition of Example 2 and/or a combination of Examples 1 and 2.

It is, therefore, apparent that a good grade of purified uric acid is produced by this process in a convenient, economical and efficient manner.

Various changes may be made in the details disclosed in the foregoing specification, without departing from the invention or sacrificing the advantages thereof.

In the claims affixed to this specification, no selection of any particular modification of the invention is intended to the exclusion of other modifications thereof, and the right to subsequently make claim to any modification not covered by these claims is expressly reserved.

What we claim and desire to secure by Letters Patent is:

1. The process of producing purified uric acid consisting of extracting uric acid from a suitable raw material containing the same by dissolving the material in an approximately eight per cent (8%) aqueous sodium hydroxide solution in the proportion of approximately one pound of material to one gallon of solution, maintaining the solution under agitation at a temperature of approximately eighty to one hundred degrees centigrade (80–100° C.) for approximately six to eight hours, filtering the extracted material, precipitating the filtrate with an excess of sulphuric acid to allow uric acid to settle out of the filtrate, filtering the uric acid settlings to form a cake of crude uric acid, dissolving the crude uric acid cake in an approximately five to six per cent (5–6%) sodium hydroxide solution in the proportion of approximately one-half pound cake to one gallon of solution to form sodium urate, evaporating the sodium urate solution to approximately twenty per cent (20%) its original volume to crystallize the sodium urate, redissolving the sodium urate crystals in an aqueous sodium hydroxide solution, precipitating uric acid from the solution with an excess of sulphuric acid, and separating the uric acid so produced and purified from the supernatant liquid.

2. The process of producing purified uric acid consisting of extracting uric acid from a suitable raw material containing the same by dissolving the material in an approximately eight per cent (8%) aqueous sodium hydroxide solution in the proportion of approximately one pound of material to one gallon of solution, maintaining the solution under agitation at a temperature of approximately eighty to one hundred degrees centigrade (80–100° C.) for approximately six to eight hours, filtering the extracted material, precipitating the filtrate with an excess of sulphuric acid to allow uric acid to settle out of the filtrate, filtering the uric acid settlings to form a cake of crude uric acid, dissolving the crude uric acid cake in an approximately five to six per cent (5–6%) aqueous sodium hydroxide solution in the proportion of approximately one-half pound cake to one gallon of solution to form sodium urate, evaporating the sodium urate solution to approximately twenty per cent (20%) its original volume to crystallize the sodium urate, filtering the solution to collect the sodium urate crystals, dissolving the sodium urate crystals in a solution of approximately three per cent (3%) aqueous sodium hydroxide in the proportion of approximately 0.75 pound crystals to one gallon of solution, evaporating the last-named solution to approximately fifteen per cent (15%) of its original volume, separating the sodium urate crystals, redissolving the crystals in approximately a three per cent (3%) aqueous sodium hydroxide solution, precipitating the last-named solution with an excess of sulphuric acid, and separating the uric acid so produced and purified from the supernatant liquid.

3. The process of producing purified uric acid consisting of extracting uric acid from a suitable raw material containing the same by dissolving the material in an approximately eight per cent (8%) aqueous sodium hydroxide solution in the proportion of approximately one pound of material to one gallon of solution, maintaining the solution under agitation at a temperature of approximately eighty to one hundred degrees centigrade (80–100° C.) for approximately six to eight hours, filtering the extracted material, precipitating the filtrate with an excess of sulphuric acid to allow uric acid to settle out of the filtrate, filtering the uric acid settlings to form a cake of crude uric acid, dissolving the crude uric acid cake in an approximately five to six per cent (5–6%) aqueous sodium hydroxide solution in the proportion of approximately one-half pound cake to one gallon of solution to form sodium urate, evaporating the sodium urate solution to approximately twenty per cent (20%) its original volume to crystallize the sodium urate, filtering the solution to collect the sodium urate crystals, dissolving the sodium urate crystals in a solution of approximately three per cent (3%) aqueous sodium hydroxide in the proportion of approximately 0.75 pound crystals to one gallon of solution, evaporating the last-named solution to approximately fifteen per cent (15%) of its original volume, filtering off the crystals of sodium urate, redissolving the sodium urate crystals in an approximately three per cent (3%) aqueous sodium hydroxide solution, decolorizing the solution with decolorizing charcoal in the proportion of approximately one pound charcoal to one pound uric acid in solution, filtering the charcoal from the solution to clarify the latter, precipitating the uric acid from the solution with an excess of sulphuric acid, and filtering off the purified uric acid so formed.

4. The process of producing purified uric acid consisting of extracting uric acid from a suitable raw material containing the same by dissolving the material in an approximately eight per cent (8%) aqueous hydroxide solution, selected from the group consisting of sodium, lithium, potassium and ammonium hydroxide solutions, in the proportion of approximately one pound of material to one gallon of solution, maintaining the solution under agitation at a temperature of approximately eighty to one hundred degrees centigrade (80–100° C.) for approximately six to eight hours, filtering the extracted material, precipitating the filtrate with an excess of mineral acid to allow uric acid to settle out of the filtrate, filtering the uric acid settlings to form a cake of crude uric acid, dissolving the crude uric acid cake in an approximately five to six per cent (5–6%) aqueous hydroxide solution, selected from the group consisting of sodium, lithium, potassium, and ammonium hydroxide solutions, in the proportion of approximately one-half pound cake to one gallon of solution to form the urate solution, evaporating the urate solution to approximately twenty per cent (20%) its original volume to crystallize the urate, redissolving the urate crystals in an aqueous hydroxide solution, selected from the group consisting of sodium, lithium, potassium and ammonium hydroxide solutions, precipitating uric acid from the solution with an excess of mineral acid, and separating the uric acid so produced and purified from the supernatant liquid.

5. The process of producing purified uric acid consisting of extracting uric acid from a suitable raw material containing the same by dissolving the material in an approximately eight per cent (8%) aqueous hydroxide solution selected from the group consisting of sodium, lithium, potassium and ammonium hydroxide solutions, in the proportion of approximately one pound of material to one gallon of solution, maintaining the solution under agitation at a temperature of approximately eighty to one hundred degrees centigrade (80–100° C.) for approximately six to eight hours, filtering the extracted material, precipitating the filtrate with an excess of mineral acid to allow uric acid to settle out of the filtrate, filtering the uric acid settlings to form a cake of crude uric acid, dissolving the crude uric acid cake in an approximately five to six per cent (5–6%) aqueous hydroxide solution selected from the group consisting of sodium, lithium, potassium, and ammonium hydroxide solutions, in the proportion of approximately one-half pound cake to one gallon of solution to form the urate solution, evaporating the urate solution to approximately twenty per cent (20%) its original volume to crystallize the urate, redissolving the urate crystals in an aqueous hydroxide solution, selected from the group consisting of sodium, lithium, potassium and ammonium hydroxide solutions, decolorizing the solution with decolorizing charcoal in the proportion of approximately one pound charcoal to one pound uric acid in solution, filtering the charcoal from the solution to clarify the latter, precipitating the uric acid from the solution with an excess of mineral acid, and filtering off the purified uric acid so formed.

6. The process of producing purified uric acid consisting of extracting uric acid from a suitable raw material containing the same by dissolving the material in an approximately eight per cent (8%) aqueous hydroxide solution selected from the group consisting of sodium, lithium, potassium and ammonium hydroxide solutions, in the proportion of approximately one pound of material to one gallon of solution, maintaining the solution under agitation at a temperature of approximately eighty to one hundred degrees centigrade (80–100° C.) for approximately six to eight hours, filtering the extracted material, precipitating the filtrate with an excess of mineral acid to allow uric acid to settle out of the filtrate, filtering the uric acid settlings to form a cake of crude uric acid, dissolving the crude uric acid cake in an approximately five to six per cent (5–6%) aqueous hydroxide solution selected from the group consisting of sodium, lithium, potassium and ammonium hydroxide solutions, in the proportion of approximately one-half pound cake to one gallon of solution to form the urate solution thereof, evaporating the urate solution to approximately twenty per cent (20%) its original volume to crystallize the urate, filtering the solution to collect the urate crystals, dissolving the urate crystals in a solution of approximately three per cent (3%) aqueous hydroxide selected from the group consisting of sodium, lithium, potassium and ammonium hydroxide solutions, in the proportion of approximately 0.75 pound crystals to one gallon of solution, evaporating the last-named solution to approximately fifteen per cent (15%) of its original volume, separating the urate crystals, redissolving the crystals in approximately a three per cent (3%) aqueous hydroxide solution, selected from the group consisting of sodium, lithium, potassium and ammonium hydroxide solutions, precipitating the last-named solution with an excess of mineral acid, and separating the uric acid so produced and purified from the supernatant liquid.

7. The process of producing purified uric acid consisting of extracting uric acid from a suitable raw material containing the same by dissolving the material in an approximately eight per cent (8%) aqueous hydroxide solution selected from the group consisting of sodium, lithium, potassium and ammonium hydroxide solutions, in the proportion of approximately one pound of material to one gallon of solution, maintaining the solution under agitation at a temperature of approximately eighty to one hundred degrees centigrade (80–100° C.) for approximately six to eight hours, filtering the extracted material, precipitating the filtrate with an excess of mineral acid to allow uric acid to settle out of the filtrate, filtering the uric acid settlings to form a cake of crude uric acid, dissolving the crude uric acid cake in an approximately five to six per cent (5–6%) aqueous hydroxide solution, selected from the group consisting of sodium, lithium, potassium and ammonium hydroxide solutions, in the proportion of approximately one-half pound cake to one gallon of solution to form the urate solution, evaporating the urate solution to approximately twenty per cent (20%) its original volume to crystallize the urate, filtering the solution to collect the urate crystals, dissolving the urate crystals in a solution of approximately three per cent (3%) aqueous hydroxide selected from the group consisting of sodium, lithium, potassium and ammonium hydroxide solutions, in the proportion of approximately 0.75 pound crystals to one gallon of solution, evaporating the last named solution to approximately fifteen per cent (15%) of its original volume, filtering off the crystals of urate, redissolving the urate crystals in an approximately three per cent (3%) aqueous hydroxide solution selected from the group consisting of sodium, lithium, potassium and ammonium hydroxide solutions, decolorizing the solution with decolorizing charcoal in the proportion of approximately one pound charcoal to one pound uric acid in solution, filtering the charcoal from the solution to clarify the latter, precipitating the uric acid from the solution with an excess of mineral acid, and filtering off the purified uric acid so formed.

8. The process of producing purified uric acid consisting of extracting uric acid from a suitable raw material containing the same by dissolving the material in an approximately eight per cent (8%) aqueous hydroxide solution selected from the group consisting of sodium, lithium, potassium and ammonium hydroxide solutions, in the proportion of approximately one pound of material to one gallon of solution, maintaining the solution under agitation at a temperature of approximately eighty to one hundred degrees centigrade (80–100° C.) for approximately six to eight hours, conducting said last named step in a vessel formed of a material selected from the group consisting of glass, silica and porcelain for reducing complications in the removal of impurities from said material, filtering the extracted material, precipitating the filtrate with an excess of mineral acid to allow uric acid to settle out of the filtrate, filtering the uric acid settlings to form a cake of crude uric acid, dissolving the crude uric acid cake in an approximately five to six per cent (5–6%) aqueous hydroxide solution selected from the group consisting of sodium, lithium, potassium and ammonium hydroxide solutions, in the proportion of approximately one-half pound cake to one gallon of solution to form the urate solution, conducting said last named step in a vessel formed of a material selected from the group consisting of glass, silica and porcelain for reducing complications in the removal of impurities from the material, evaporating the urate solution to approximately twenty per cent (20%) its original volume to crystallize the urate, redissolving the urate crystals in an aqueous hydroxide solution, selected from the group consisting of sodium, lithium, potassium and ammonium hydroxide solutions, conducting said last named step in a vessel formed of a material selected from the group consisting of glass, silica and porcelain for reducing complications in the removal of impurities from said material, precipitating uric acid from the solution with an excess of mineral acid, and separating the uric acid so produced and purified from the supernatant liquid.

HOWARD S. GABLE.
JOSEPH MICHAEL BLOODSWORTH.